UNITED STATES PATENT OFFICE.

THOMAS B. ALLEN AND FRANK J. TONE, OF NIAGARA FALLS, NEW YORK, ASSIGNORS TO THE CARBORUNDUM COMPANY, OF NIAGARA FALLS, NEW YORK, A CORPORATION OF PENNSYLVANIA.

METHOD OF TREATING ELECTROMETALLURGICAL PRODUCTS.

1,061,255.  Specification of Letters Patent.  Patented May 13, 1913.

No Drawing.  Application filed August 12, 1910.  Serial No. 576,807.

*To all whom it may concern:*

Be it known that we, THOMAS B. ALLEN and FRANK J. TONE, residents of Niagara Falls, in the county of Niagara and State of New York, have invented a new and useful Method of Treating Electrometallurgical Products, of which the following is a full, clear, and exact description.

Our invention relates to metallurgical products, particularly those used for abrasive or refractory purposes, and is designed to remove certain impurities therefrom and improve their bonding qualities. In these electrometallurgical products, certain impurities are present in or on the grains or crushed product which are specially detrimental to their proper bonding. If a vitrified binder is used, such impurities tend to flux the bonding materials and prevent the formation of a homogeneous article. With many bonded articles, the impurities react with the binding or bonding material to destroy or weaken it. We have discovered that by treating these electrometallurgical products with sulfur or sulfur-containing material, such as sulfur-containing gases, these impurities can be removed, and the product greatly improved, especially as to its bonding capacity. The treatment is suitable for a large number of electrometallurgical products, such as carbides of silicon, boron and titanium, and the aluminous products resulting from the smelting of ores of aluminum, such as bauxite, aluminous silicates and similar minerals.

In carrying out our invention in its preferred form, we crush the product of the electric furnace to the size or sizes best adapted for use for the desired purpose, such as an abrasive or refractory material. This crushed product is then heated in the presence of sulfur or sulfur-containing gases in any suitable manner. We may heat the grains in contact with sulfur or may pass hydrogen sulfid or other sulfur-containing gases over the heated grains, or may carry out both these steps to obtain the desired results.

In heating the aluminous products, we preferably raise them to a temperature sufficient to volatilize the sulfids formed from the impurities present, but with carbids and similar products the temperature should be maintained below the reaction temperature of the sulfur and the carbid, such as carbid of silicon or similar product. We have found that with all products the impurities can be decomposed below the temperature at which the sulfur or sulfur-containing gases react with the abrasive product itself. The length of heating, the amount of sulfur or sulfur-containing gases, and the temperature may be varied according to the nature and quantity of the impurities present. After the above treatment, the grains are then preferably washed with water or dilute mineral acids and may then be treated in any further manner suitable for abrasive or refractory purposes. In removing, for example, the impurities existing in the crystalline alumina-silica material, made according to U. S. Patent No. 906,339, issued March 17th 1908, to Frank J. Tone (one of the present inventors) we preferably place sulfur vapor in contact with the suitably crushed product in a rotary kiln heated to a temperature of 800 to 1200 degrees centigrade for a period of 24 to 36 hours. Impurities to be removed are, firstly an alloy consisting of iron titanium and silicon, and secondly a carbid or suboxid of aluminum. Under these conditions there are formed sulfids of iron, titanium, silicon and aluminum which are partly volatilized and the remaining amounts are removed by subsequent treatment with water and dilute mineral acid.

So far as we understand the process, the action is probably a reaction of the impurities with the sulfur to form sulfids. The impurities present are usually carbids, silicids and other metallic alloys, and we have found that these materials readily react with sulfur or sulfur-containing gases. Sulfids thus formed from the impurities can be volatilized when treating aluminous products, but in the case of carbid of silicon and similar products, the impurities are changed into sulfids, and these sulfids are then removed by treatment with water or mineral acids.

The advantages of our invention will be obvious to those skilled in the art.

The articles made from the grains thus treated are homogeneous in character, and the articles have increased strength and wearing qualities, making them better adapted for abrasive and refractory purposes. The impairing of the bond by these impurities is reduced or done away with and a bonding action obtained. As the impurities are in very intimate contact with the abrasive grains, their removal tends to roughen and make irregular the surface of the grains, giving them better bonding qualities.

Many changes may be made in the product treated, the method of obtaining the product, the use therefor, and the manner of treatment, without departing from our invention.

By the term "sulfur", as used in the appended claims, I intend to cover either sulfur itself or sulfur-containing gases, as hereinbefore described, non-oxygenated gases containing sulfur being preferably employed.

We claim:

1. The process of removing the carbids and silicids which exist as impurities in electrometallurgical products used for abrasive or refractory purposes, which consists in treating said products with sulfur.

2. The process of removing the carbids and silicids which exist as impurities in electrometallurgical products used for abrasive or refractory purposes, which consists in treating said products with sulfur under the action of heat.

3. The process of improving the bonding qualities of electrometallurgical products used for abrasive or refractory purposes, which consists in removing the carbids and silicids existing in said products as impurities by the action of sulfur.

In testimony whereof, we have hereunto set our hands.

THOS. B. ALLEN.
FRANK J. TONE.

Witnesses:
ASHMEAD G. RODGERS,
L. B. COULTER.